United States Patent Office 3,134,496
Patented May 26, 1964

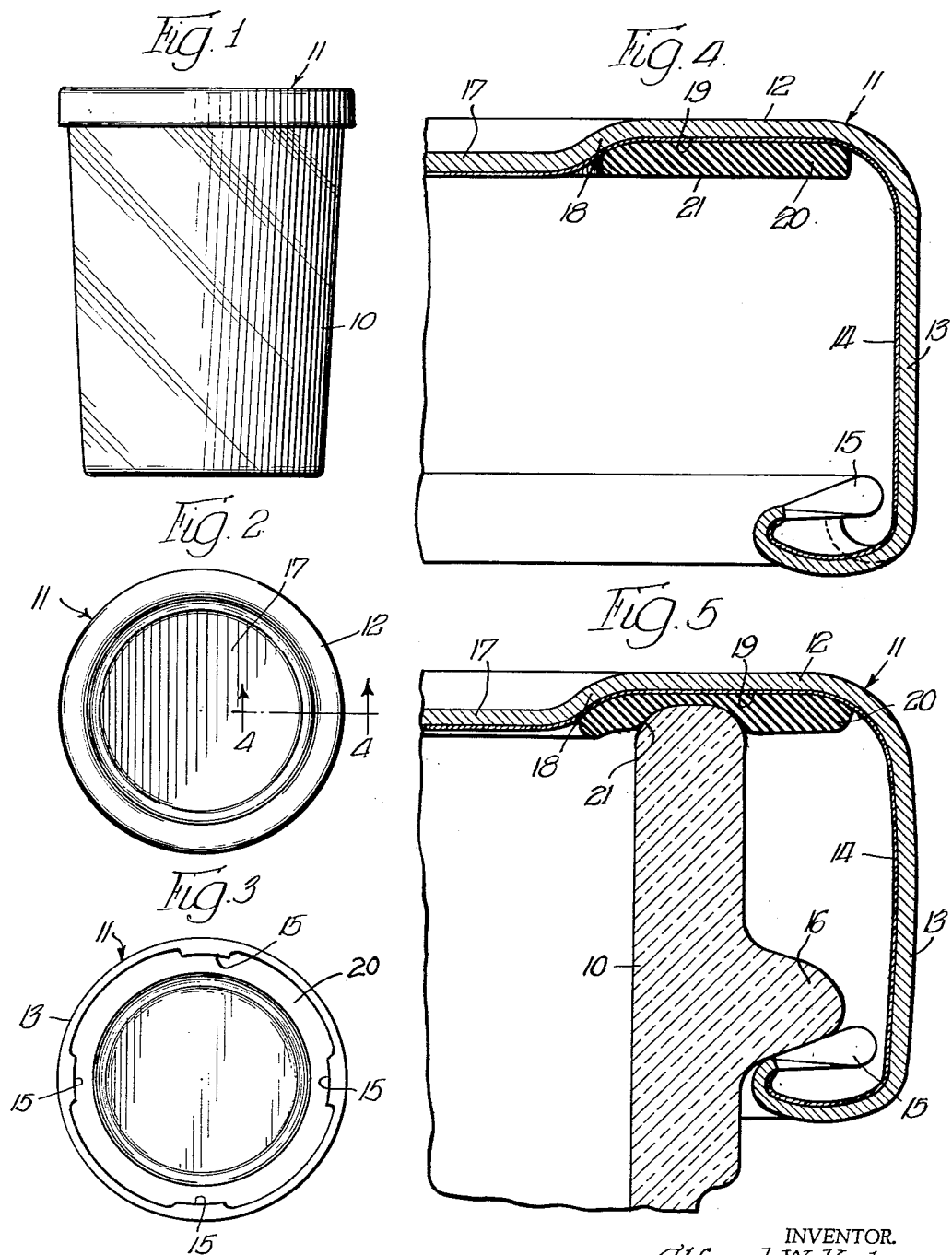

3,134,496
CLOSURE MEMBER GASKET COMPOSITIONS
Alfred W. Kehe, Berkeley, Ill., assignor to Continental Can Company, Inc., New York, N.Y., a corporation of New York
Filed Sept. 11, 1961, Ser. No. 137,308
6 Claims. (Cl. 215—40)

This invention relates to new and improved closure member gasket compositions especially adapted for effecting a hermetic seal on a product container. More specifically, the gasket compositions and closure member including such compositions of the present invention involve the use of chlorinated polyolefins as a resin constituent of the compositions in a manner which provides for improved elasticity, heat resistance, low gas permeability, and bonding characteristics with decorating lacquers.

In the field of food packaging utilizing glass containers and metal closures such as lug caps and screw caps, in carrying out vacuum packaging of the heated vapor type, closure member sealing gaskets have been generally fabricated from rubber or plasticized polyvinyl chloride based compounds. The rubber compounds used include Buna N, Buna S, or butyl rubber. The vinyl chloride compounds have included plasticized homopolymers which are externally plasticized as well as copolymers of vinyl acetate, vinyl stearate, etc., as comonomers which are internally plasticized. The physical properties of typical sealing compounds of the type described are as follows:

|  | Butyl Rubber | Plasticized Polyvinyl Plastisol |
|---|---|---|
| Elongation, percent | 239 | 170 |
| Moduli of 50 percent | 210 | 880 |
| Elasticity 100 percent | 480 | 1,596 |
| Tensile | 670 | 1,966 |
| Hardness (Shore A) | 76 | 98 |
| Compressive Set, percent | 5 | 48 |
| Specific Permeability (Air)10⁻⁴ ¹ | 1.75 | 3.76 |

¹ (All values including those hereinafter are calculated as cu. ft./mil./sq. ft./24 hrs.)

From the foregoing comparative data it will be noted that the plastisol compositions constitute a substantial improvement over the basic butyl rubber compositions in many respects. However, there are several disadvantages existing in plastisol compositions. For example, the use of plasticizers essential for the polyvinyl chloride affects compressive set, gas permeability and creates a fugitive problem. The latter problem is of particular importance in the packaging of food products. An additional problem may arise with highly plasticized polyvinyl chloride with regard to maintaining adequate bonding characteristics of the plastisol to reverse lacquer-type closure coatings under elevated temperature conditions.

It is an object of the present invention to provide new and improved gasket compositions for use in product container closures to effect a hermetic seal, and a new improved closure member incorporating therein the gasket material of the invention.

A further object is to provide a new and improved resin base gasket material, the resin base including a chlorinated polyolefin as a major constituent of the composition and eliminating the necessity of incorporating therein a special plasticizer constituent.

Still another object is to provide a new and improved resin base gasket material for use in product container closures to effect a hermetic seal, the resin base of the gasket material comprising a homopolymeric mixture of a chlorinated polyolefin and polyvinyl chloride, the gasket material exhibiting good flexibility, heat resistance and bonding characteristics to decorating lacquers and improved elasticity and gas impermeability in the absence of fugitive plasticizers.

Other objects not specifically set forth will become apparent from the following detailed descripton of the invention made in conjunction with the accompanying drawing wherein:

FIG. 1 is an elevation of a typical sealed container using the improved closure member of the present invention;

FIG. 2 is a top plan view of the closure member;

FIG. 3 is a bottom plan view of the closure member;

FIG. 4 is an enlarged fragmentary section of a portion of the closure member illustrating the use of the gasket composition therein, this view being taken generally along line 4—4 in FIG. 2; and FIG. 5 is a view similar to FIG. 4 illustrating the sealing function of the gasket composition upon application of the closure member to a container.

The invention involves the use of chlorinated polyolefins as a substantial part of the resin base of a gasket composition. Preferably, a homopolymer of chlorinated ethylene is used in mixtures with a polyvinyl chloride. Chlorinated homopolymers or copolymers of the group including ethylene, butene and propylene may be used. Other constituents of the gasket composition include stabilizers and pigments as well as fillers and lubricants where desired.

Unlike conventional linear polyethylene, chlorinated polyethylene possesses outstanding flexibility, improved elasticity, good heat resistance, low gas permeability, and good bonding characteristics to lacquer-type coatings. In this regard chlorinated polyethylene can possess a high degree of crystallinity which aids in maintaining gas permeability at a very low order. Unchlorinated polyethylene manufactured by the low pressure process can result in molecular weights which can be controlled within the range of 10,000 (low density) to approximately 2,000,000 (high density). Generally speaking, the highest molecular weight practically attained with the high pressure process is approximately 50,000. By use of the low pressure process, a polyethylene product possessing a minimum crystallinity of about 85% can be obtained whereas high pressure products often exhibit a crystallinity of about 65%. Preferably, in carrying out the teachings of the present invention the chlorinated polyethylene used will possess a relatively high molecular weight and exhibit crystallinity of at least about 85%, still more preferably 93% to 95%.

It has been found that chlorinated polyethylene exhibits excellent compatibility with polyvinyl chloride and functions much as a plasticizer in that it imparts improved elasticity and flexibility in the absence of otherwise fugitive and volatile plasticizers. The polyvinyl chloride homopolymer is advantageously used with chlorinated polyethylene in gasket compositions of the present invention for improvement in taste and odor properties while additionally assisting in the reduction of otherwise high compressive set values of chlorinated polyethylene. In this regard combined chlorinated polyethylene and polyvinyl chloride in equal parts by weight exhibit the following physical properties:

| | |
|---|---:|
| Elongation, percent | 230 |
| Moduli of 50 percent | 2303 |
| Elasticity 100 percent | 2623 |
| Tensile | 2946 |
| Hardness (Shore A) | 98.6 |
| Compressive set percent | 65 |
| Specific permeability (Air) $10^{-4}$. | 0.42 |

By comparing the foregoing properties with those listed above in connection with rubber and plastisol gasket compositions, it will be noted that a substantial improvement in physical properties is obtained with combinations of chlorinated polyethylene and polyvinyl chloride.

The extent to which the polyethylene is chlorinated is of material importance with regard to the forming of improved gasket compositions of the present invention. It has been found that the various grades of polyethylene should be chlorinated to within the range of about 40% to 50%. In order to obtain the improved bonding characteristics of the gasket compositions, the chlorine content of the polyolefin should be at least 40%. It has been found that exceptional compatibility with polyvinyl chloride type resins is obtained when the chlorine content of the polyolefin is in this range. Furthermore, it has been found that gas permeation (specific permeability) is governed to a large extent by the degree of chlorination rather than being basically controlled by the molecular weight of the polyolefin.

Typical sealing compositions which exhibit extremely low gas permeability as well as the other desirable advantages mentioned above comprise from 0 to 75 parts of polyvinyl chloride homopolymer or copolymer and from 25 to 100 parts of chlorinated polyethylene homopolymer or copolymeric polyolefin in which chlorination ranges from about 40% to 50%. For each 100 parts resin, the composition includes 1 to 2 parts of organometallic or organic acid salt stabilizer, 0 to 5 parts epoxidized oil or fatty acid ester stabilizer, 0 to 5 parts pigment, and 0.5 to 5 parts lubricant selected from fatty acids, petroleum waxes and/or silicone oil. Sealing gaskets of various thicknesses can be made from these compositions utilizing standard techniques such as calendering, extrusion, or hot melt, the calendering or extrusion of a sheet and the cutting of gasket rings therefrom constituting the preferred technique. The composition may also be dissolved in aromatic and ketone type solvents or solvent combinations for the preparation of resilient, flexible and low gas permeable coatings particularly applicable to metal decorating.

The accompanying drawing illustrates the basic use of the gasket composition of the present invention and certain physical property requirements which must be met during such use. In FIG. 1 a glass container 10, such as an ordinary jelly glass, is sealed with a closure cap 11. The closure cap 11 is of the type shown in FIGS. 2–4 consisting of a cap body or shell having a top panel portion 12 and a depending skirt portion 13. The cap body or shell is stamped out from suitable coated tin plate although other materials may be used. Generally, the tin plate is enameled on the exterior and the interior is enameled or covered with a known type of lacquer formulation so as to form a protective coating 14 to prevent contact between the metal of the cap and the product in the container 10. The bottom edge of the depending skirt 13 is normally rolled to reinforce this edge while providing a neat appearance and removing the sharp edge which is left when the cap shell or body is stamped out. The lug-type closure cap illustrated is provided with a plurality of lugs 15 for cooperative cap clamping engagement with circumferentially spaced glass threads 16 integrally formed on the exterior of the neck portion of the glass container 10 as shown in FIG. 5.

The top panel 12 of the cap 11 is provided with a central depressed portion 17 which defines a continuous annular shoulder 18 inwardly of the skirt 13. The shoulder 18 and skirt 13 thus define therebetween an annular gasket-receiving channel 19. A cut ring gasket 20 is carried in the channel 19. Application of the cap 11 to the container 10 is shown in FIG. 5 with the top edge of the neck of the container 10 (which is generally referred to as the sealing finish) being embedded in the gasket 20. Removal of the cap 11 from the container 10 requires the application of torque and control of the opening torque to permit substantial uniformity in torque required for caps of the type described is provided by the presence of a lubricant coating 21 on the sealing surface of the gasket 20 for direct contact with the sealing finish of the container 10. Lubricants which are useful with the coating compositions of the present invention include dimethylpolysiloxane, fatty acids and petroleum wax. Other lubricants may also be used. Such lubricants may be directly incorporated in the gasket compositions during preparation thereof on the basis that the lubricants are generally incompatible with the compositions and "bleed" to the exposed surface thereof to form the coating-type covering 21. If desired, the lubricants may be directly applied to the sealing surface of the gasket 20 to form the coating 21.

In considering the cap 11 described and its intended function, it will be appreciated that the gasket 20 must be firmly adhered to the lacquer-type coating 14 to maintain its operative position within the cap 11 and to prevent separation from the inner surface of the cap 11 during substantial deformation upon cap application as shown in FIG. 5. If the gasket 20 separates from the coating 14, air leakage may occur between the separated surfaces. It has been found that the gasket compositions of the present invention exhibit excellent bonding characteristics with lacquer-type coatings such as vinyl base coatings modified with either phenolic and epoxy resins or phenolic and butadiene-acrylonitrile rubber. Processing at temperatures of from 200° to 250° F. does not interfere with the retention of adequate gasket adhesion.

Also as illustrated in FIG. 5, the gasket composition must be capable of resisting "cut-through" upon cap application and product processing at elevated temperatures. The top sealing edge of the jar 10 becomes substantially embedded in the gasket 20 in the establishing of a hermetic seal. Excellent cut-through resistance at product processing temperatures such as 200° to 250° F. is obtained with the gasket compositions of the invention. Furthermore, the resilient properties of the composition permit excellent glass impression (extent to which jar edge becomes embedded) to provide good sealing contact. The hardness values given herein are based on the standard Shore test using the ranges indicated. While the cap 10 illustrated in the drawing provides a top or crown seal, it has been found that the gasket compositions may be successfully used with other types of closure members including those establishing a side seal with a container finish.

Various types of gasket compositions of the present invention and specific formulations thereof are listed below. Such compositions are recommended for applications requiring exceptionally low oxygen permeation and high cut-through resistance at processing temperatures of about 250° F.

Type I

| | Parts by weight |
|---|---|
| Chlorinated Polyethylene (medium to high density with 45% to 50% chlorination) | 100 |
| Stabilizers (calcium or zinc oleates, stearates, ricinoleates) | 1 to 2 |
| Stabilizers (epoxidized oils, epoxidized fatty acid esters) | 0 to 5 |
| Pigments (titanium dioxide, zinc oxide) | 0 to 5 |
| Lubricant | 0.5 to 5 |

Type II

| | Parts by weight |
|---|---|
| Chlorinated Polyethylene (medium to high density with 40% to 50% chlorination) | 50 to 70 |
| Polyvinyl Chloride (emulsion or suspension type) | 30 to 50 |
| Stabilizers (calcium or zinc oleates, stearates, ricinoleates) | 1 to 2 |
| Stabilizers (epoxidized oils, epoxidized fatty acid esters) | 0 to 5 |
| Pigments (titanium dioxide, zinc oxide) | 0 to 5 |
| Lubricant | 0.5 to 5 |

The compositions prepared in accordance with the formulations of Type I above are especially recommended for use with meat products. For gasket sealing applications requiring good resilience, taste and odor characteristics, cut-through resistance below 220° F. and a low order of oxygen permeation, the following formulations are recommended:

Type III

| | Parts by weight |
|---|---|
| Chlorinated Polyethylene (low density with 40% to 50% chlorination) | 100 |
| Stabilizers (calcium or zinc oleates, stearates, ricinoleates) | 1 to 2 |
| Stabilizers (epoxidized oils, epoxidized fatty acid esters) | 0 to 5 |
| Fillers (calcium carbonate, calcium silicate, aluminum silicate) | 30 to 50 |
| Pigments (titanium dioxide, zinc oxide) | 0 to 5 |
| Lubricant | 0.5 to 5 |

The above compositions are particularly suitable for the calendering of 0.01 to 0.04 of an inch thick sheet stock from which closure gaskets are cut. The sheet stock may be processed on a two roll hot mill utilizing a temperature range of 320° to 350° F. for about 15 minutes. The best processing temperature depends on the ratio of chlorinated polyethylene to polyvinyl chloride. The fabricated gaskets may be adhered to the lacquer-type coating of a cap at temperatures of about 390° to 410° F. merely upon contact for 5 to 10 seconds. The polyvinyl chloride used will have a molecular weight ranging from about 50,000 to 100,000. As previously stated, polyvinyl chloride may be used in amounts ranging from 0 to 75 parts for each 100 parts total resin and the preferred amount will range from about 30 to 50 parts. Total resin stabilizer used in the composition will preferably not exceed 7 parts for each 100 parts total resin.

The physical properties of the compositions included in Type I above will conform approximately to the following:

| | |
|---|---|
| Elongation, percent | 130 |
| Tensile | 2376 |
| Hardness (Shore D) | 48 |
| Compressive set, percent | 56 |
| Specific permeability (Air) $10^{-4}$. | 0.73 |

The physical properties of the compositions of Type II above have been set out above in connection with a comparison with rubber and plastisol compositions. The physical properties of the compositions of Type III above are generally as follows:

| | |
|---|---|
| Elongation, percent | 476 |
| Tensile | 913 |
| Hardness (Shore A) | 77.3 |
| Compressive set, percent | 87.6 |
| Specific permeability (Air) $10^{-4}$. | 0.36 |

The gasket compositions involving the combination of chlorinated polyolefins and polyvinyl chloride constitute a physical mixture of the resin as distinguished from a copolymer. The chlorinated polyolefins are not plasticized but do function somewhat as a plasticizer for polyvinyl chloride. Thus the composition is internally plasticized in effect and the chlorinated polyolefin constituent acts as an excellent non-fugitive plasticizer while improving the gas impermeability of the composition. Plastisol composition adapted for similar use would exhibit a gas permeation factor many times greater than that of the compositions of the present invention.

Obviously certain modifications and variations of the invention as hereinbefore set forth may be made without departing from the spirit and scope thereof, and therefore only such limitations should be imposed as are indicated in the appended claims.

I claim:
1. A gasketing composition for use in product container closures to effect a hermetic seal, the resin base of said gasket material comprising a homopolymeric mixture of polyvinyl chloride and a chlorinated polyolefin selected from the group consisting of polyethylene, polybutene, polypropylene and mixtures thereof, said chlorinated polyolefin having a chlorine content of from about 40% to about 50% by weight, the amount of polyvinyl chloride present ranging from about 30% to 50% of the total resin base with the polyolefin constituting the remainder of said base.

2. A gasketing composition comprising for each 100 parts total resin from 0 to about 50 parts polyvinyl chloride, 50 to 100 parts chlorinated polyolefin selected from the group consisting of polyethylene, polybutene and polypropylene, the chlorination of said polyolefin ranging from about 40% to 50%, 1 to 7 parts resin stabilizer, and 0 to 5 parts pigment.

3. A gasketing composition comprising for each 100 parts total resin from about 30 to 50 parts polyvinyl chloride, 50 to 70 parts chlorinated polyolefin selected from the group consisting of polyethylene, polybutene and polypropylene, the chlorination of said polyolefin ranging from about 40% to 50%, 1 to 7 parts resin stabilizer, and 0 to 5 parts pigment.

4. A closure member for use with a product container to effect a hermetic seal, said closure member comprising a panel portion including means to obtain mechanical engagement with a container, the inner surface of said panel portion normally exposed to product in a container having applied thereto a continuous lacquer-type coating, and a resin base gasket on said inner face in contact with said coating to effect a hermetic seal between said closure member and a container, the resin base of said gasket comprising at least about 50% to 100% chlorinated polyolefin selected from the group consisting of polyethylene, polybutene and polypropylene which is chlorinated to within the range of from about 40% to 50% the remainder of said resin base constituting from 0 to about 50% polyvinyl chloride.

5. A closure member for use with a product container to effect a hermetic seal, said closure member comprising a panel portion including means to obtain mechanical engagement with a container, the inner surface of said panel portion normally exposed to product in a container having applied thereto a continuous lacquer-type coating, and a resin base gasket on said inner surface in contact with said coating to effect a hermetic seal between said closure member and a container, the resin base of said gasket comprising a homopolymeric mixture of chlorinated polyethylene and polyvinyl chloride, said chlorinated polyethylene having a chlorine content of from about 40% to about 50% by weight, the amount of polyvinyl chloride present constituting no more than about 50% of the resin base.

6. A closure member for use with a product container to effect a hermetic seal, said closure member comprising a panel portion including means to obtain mechanical engagement with a container, the inner surface of said panel portion normally exposed to product in a container having applied thereto a continuous lacquer-type coating, and a resin base gasket on said inner surface in contact with said coating to effect a hermetic seal between said closure member and a container, the resin base of said gasket consisting essentially of a homopolymeric mixture of chlorinated polyethylene and polyvinyl chloride, said chlorinated polyethylene having a chlorine content of from about 40% to about 50% by weight, the amount of polyvinyl chloride present ranging from about 30% to 50% of the resin base.

References Cited in the file of this patent

UNITED STATES PATENTS

| | | |
|---|---|---|
| 1,928,987 | Warth | Oct. 3, 1933 |
| 3,005,433 | Risch | Oct. 24, 1961 |

FOREIGN PATENTS

| | | |
|---|---|---|
| 810,786 | Great Britain | Mar. 25, 1959 |
| 861,854 | Great Britain | Mar. 1, 1961 |